(12) United States Patent
Mac Farland

(10) Patent No.: US 6,422,637 B1
(45) Date of Patent: Jul. 23, 2002

(54) RETRACTABLE MOTOR VEHICLE TOP AS WELL AS MOTOR VEHICLE COMPRISING THIS TOP

(75) Inventor: David Mac Farland, Unterschleissheim (DE)

(73) Assignee: Dura Convertible Systems GmbH, Cologne (DE)

( * ) Notice: Subject to any disclaimer, the term of this patent is extended or adjusted under 35 U.S.C. 154(b) by 0 days.

(21) Appl. No.: 09/686,779

(22) Filed: Oct. 11, 2000

(30) Foreign Application Priority Data

Oct. 12, 1999 (EP) .......................................... 99 120 352

(51) Int. Cl.[7] .............................. B60J 7/14; B60J 7/12; B60J 7/20
(52) U.S. Cl. .............................. 296/107.15; 296/107.17
(58) Field of Search ....................... 296/107.13, 107.15, 296/107.17, 107.09, 108, 116

(56) References Cited

U.S. PATENT DOCUMENTS

| | | | |
|---|---|---|---|
| 2,704,225 A | * | 3/1955 | Anschuetz et al. ......... 296/108 |
| 3,655,238 A | * | 4/1972 | Stewart ................. 296/107.15 |
| 5,769,483 A | * | 6/1998 | Danzl et al. ............ 296/108 X |
| 5,772,274 A | * | 6/1998 | Tokarz ................... 296/107.09 |
| 5,806,912 A | * | 9/1998 | Ramaciotti et al. .... 296/107.09 |
| 5,979,970 A | * | 11/1999 | Rothe et al. ........... 296/107.17 |
| 6,209,945 B1 | * | 4/2001 | Aydt et al. .......... 296/107.15 X |

FOREIGN PATENT DOCUMENTS

| | | |
|---|---|---|
| DE | 34 16 286 A 1 | 10/1984 |
| DE | 36 35 373 A 1 | 4/1988 |
| DE | 43 16 485 A 1 | 11/1994 |
| EP | 0 835 780 A1 | 4/1998 |

* cited by examiner

Primary Examiner—Joseph D. Pape
Assistant Examiner—Patricia Engle
(74) Attorney, Agent, or Firm—David A. Greenlee

(57) ABSTRACT

The present invention refers to a retractable top (3) of a motor vehicle, in particular for at least 4-seat convertibles (1), comprising: an upper, substantially rigid roof section (5) which forms an upper roof portion and which can be connected to the upper edge portion (19) of the windshield (17), a rear, substantially rigid roof section (7) which is connected to the upper roof section (5) and extends behind the passenger compartment of the motor vehicle (1), a rear window (9) arranged at the rear roof section (7), wherein the upper and the rear roof section (5, 7) are arranged pivotal into and out of an accommodation chamber (13) in the motor vehicle. The invention is characterized in that the upper roof section (5) comprises a first front (21) and a second central (23) partial roof section, that when pivoting the top (3) from an unfolded roof position into a hidden open position, the second central partial roof section (23) moves into the rear roof section (7) and at the same time the first front partial roof section (21) moves over the second central partial roof section (23) and along the same and between the same and the rear partial roof section (7). The present invention further refers to a motor vehicle that comprises such a retractable top (3) of a motor vehicle.

10 Claims, 5 Drawing Sheets

RETRACTABLE MOTOR VEHICLE TOP AS WELL AS MOTOR VEHICLE COMPRISING THIS TOP

FIELD OF THE INVENTION

The present invention refers to a retractable vehicle top, in particular for at least four-seat convertibles having an upper, substantially rigid roof section, which forms an upper roof section and which can be connected to the upper edge portion of the windscreen, a rear, substantially rigid roof section which adjoins the upper roof section and which extends behind the passenger compartment of the motor vehicle, a rear window which is arranged at the rear roof section, wherein the upper and the lower roof section are arranged in a manner pivotal into and out of an accommodation chamber in the motor vehicle. Furthermore, the present invention refers to a motor vehicle which comprises a top of that type.

BACKGROUND OF THE INVENTION

For some time, the demands on motor vehicles whose roof can be opened and closed have been increasing considerably. These motor vehicles, usually termed as convertibles, are increasingly used as all-year cars, which has lead to considerably increased demands on the roof structure including the seals.

Besides the roof structure by means of a flexible top which can be folded up and down by means of a corresponding rod assembly, so-called hard tops were additionally frequently designed which are set onto the motor vehicle as a complete roof element. These hard tops do not offer the possibility of hiding away these tops in the motor vehicle itself, but these hard tops must be stored at a separate location.

The applicant itself has already developed a retractable hard top which consists of two roof sections, an upper, substantially rigid roof section which forms an upper roof portion and which can be connected to the upper edge portion of the windscreen, a lower, substantially rigid roof section which is connected to the upper roof section and which extends behind the passenger compartment of the motor vehicle, wherein a rear window is arranged in the rear roof section. Both roof sections are jointly arranged in a manner pivotal into and out of an accommodation chamber in the vehicle.

SUMMARY OF THE INVENTION

This top in particular fulfills the demands on an excellent roof structure for conventional convertibles which usually comprise two seats only and possibly two spare seats.

Thus, the object of the present invention is to provide a retractable top of a motor vehicle, which is in particular suitable for larger motor vehicles, at least four-seat convertibles.

This object is achieved by a retractable vehicle top of the aforementioned type wherein the upper roof section comprises a first front and a second central partial roof section, and wherein when pivoting the top (3) from an unfolded roof position into a hidden open position, the second central partial roof section (23) moves into the rear roof section (7) and at the same time the first front partial roof section (21) moves over the second central partial roof section and along this roof section (23) and between this roof section and the rear partial roof section (7).

By the fact that the upper roof section comprises a first front and a second central partial roof section, and when pivoting the top from an unfolded roof position into a retractable open position the second central partial roof section moves into the rear roof section and at the same time the first front partial roof section moves across the second central partial roof section and between same and the rear roof section it is achieved that the top can be folded in a space-saving manner and the possibility is achieved to accommodate the top, although it is formed as a hard top, completely into the accommodation chamber of the motor vehicle. The solution according to the invention therefore enables to provide a correspondingly long upper roof section which covers a correspondingly long passenger compartment in the closing position of the top. Advantageously the top of the motor vehicle comprises a flexible outer skin or layer, in particular made of a textile tissue, wherein this outer skin is planarly connected to the rear roof section and to the first front partial roof section. Thereby it is achieved that a considerable reduction of the surface treatment of the rigid roof section becomes possible, e.g. an outer varnishing is no longer necessary. Moreover, the advantage is achieved that due to the fact that the outer skin safely seals against the interior of the vehicle, no additional costly sealing measures at the separation joints between the roof sections or partial roof sections are necessary. Compared to conventional hard tops, a significant reduction in cost is obtained, since the roof sections or partial roof sections may be formed of a plastic material, which moreover leads to a light construction. Moreover, the planar connection ensures a correspondingly clean processing.

The positive outer appearance of the motor vehicle top according to the invention is increased in that when the top is closed, a tensile force is exerted by the outer skin to the roof sections and therefore the outer skin extends in a tensioned manner across the entire roof without any formation of folds.

Furthermore, two linkages at each longitudinal vehicular side are advantageously provided, which are pivotally supported in a manner longitudinally movable in a slide rail and enable the first front roof section to pivot up over the second central roof section and to move across same and along same.

Caused by the tensile force exerted by the outer skin, which in particular acts on the first front partial roof section and its front edge, the first front partial roof section is slightly lifted when releasing the roof locking means from the upper edge portion of the windshield where the counter support of the locking means is attached, since the first front partial roof section can pivotally move upwards caused by the hinge connection rod.

For further moving the top a force is advantageously exerted from the front onto the first front partial roof section, whereby this partial roof section moves according to the length of the hinge connection rods towards the top and then across the second central partial roof section and along thereof.

Advantageously the exerted force is created by a motor, which may be located for instance in the center of the top, i.e. basically on its axis of symmetry.

Advantageously two connection rods at each longitudinal side of the vehicle are provided between the second central partial roof section and the rear roof section, wherein one connection rod at each longitudinal side of the vehicle is arranged in the closing position of the top above the second connection rod and offset with respect to same towards the front, and each connection rod is pivotally supported at one of its ends at the second central partial roof section and at the rear partial roof section at the other end.

Thereby it is achieved that when pivoting the top, the central second partial roof section is pivoted into the rear partial roof section and this is performed by means of an extremely simple construction. For this purpose, a further connection rod at each longitudinal side of the vehicle is advantageously provided, which is on the one hand pivotally connected to a pedestal and which is on the other hand pivotally connected to the lower connection rod.

Furthermore, the rear window is advantageously rigid, in particular as a glass pane and while the rear roof section is pivoted into its retractable position, the rear window moves into the rear roof section. Thereby it is advantageously achieved that the space requirement of the folded top can be significantly reduced, since the entire rear window in the lowered position is pivoted upwardly and a larger space remains is generated underneath, which may comprise further important parts of the motor vehicle, such as the fuel tank.

The present invention also refers to a motor vehicle, in particular an at least 4-seat convertible, which is characterized in that it comprises a top according to the present invention.

Further details, features and advantages of the present invention can be derived from the following description with reference to the drawing.

BRIEF DESCRIPTION OF THE DRAWINGS

In the drawings the same elements are provided with the same reference numerals.

DETAILED DESCRIPTION OF A PREFERRED EMBODIMENT

Figure 1:
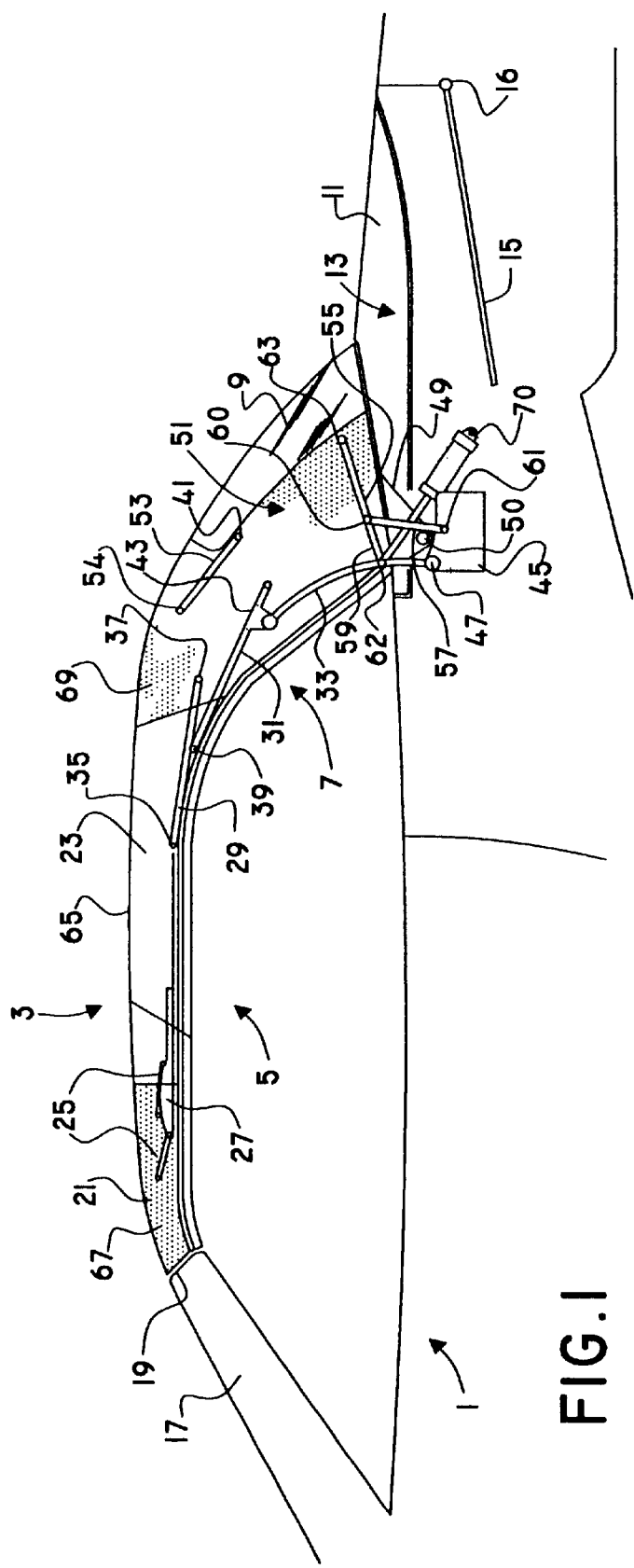
FIG. 1 shows a diagrammatic side view of a retractable top of a motor vehicle in closed position of the roof according to the invention.

FIG. 1 shows a motor vehicle 1 in the form of an at least 4-seat convertible, which comprises a correspondingly large passenger compartment. The motor vehicle 1 comprises a top 3 of the motor vehicle, comprising an upper, substantially rigid roof section 5 and a rear, substantially rigid roof section 7. The rear roof section 7 comprises a rear window 9 in the form of a rear pane. The lower edge portion of the rear roof section 7 and of the rear window 9 is encompassed by a known cover 11 which is supported pivotally and which covers a top accommodation space 13. The top accommodation space 13 comprises a bottom plate 15 which is pivotally arranged around the axis of rotation 16. In the example of FIG. 1 the bottom plate 15 is in its upper position.

A holding means (not shown) is provided at the upper edge 19 of a windshield 17, said holding means serving for accommodating a closure means (also not shown) of the top 3 of the motor vehicle.

The upper roof section 5 is divided into a first front partial roof section 21 and a second central partial roof section 23. Two joint connection rods 25 are provided at each longitudinal side of the motor vehicle, which are hingedly connected at a spacing to the first front partial roof section 21 and which are rotatably guided at their other end in a slide rail 27, which in turn is connected to the second central roof section 23. The function of the joint connection rods with the slide rail will be described further below.

As may further be derived from FIG. 1, an upper connection rod 29 and a lower connection rod 31 are provided at each longitudinal side of the motor vehicle, as well as a further connection rod 33. The connection rods 29, 31 and 33 serve for pivoting the second central partial roof section with respect to the rear roof section 7, wherein a co-pivoting of the first front partial roof section 21 compulsorily also takes place. The upper connection rod 29 is hingedly connected at a front connection point 35 to the second central roof section 23 and it is hingedly connected to the rear roof section 7 in a rear connection point 37. The lower connection rod 31 is connected at a front connection point 39 to the second central partial roof section 29, and at a rear connection point 41 to the rear roof section 7. Furthermore, the connection rod 33 is hingedly connected at an upper hinged connection 43 to the lower connection rod 31 wherein the upper hinged connection 43 is located between the rear connection point 41 and the front connection point 39. The connection rod 33 is connected at its other end via a lower hinged connection 47 to a pedestal or supporting plate 45, which in turn is connected to the motor vehicle.

The rear roof section 7 is rotatably connected to the motor vehicle via a supporting plate or supporting flange 49 around a point of rotation 50.

Furthermore, a hinged mechanism 51 is provided for the lower portion of the rear window 9 and a rotary hinge 53, that is pivoted at 54 to rear roof section (7), is provided for the upper portion of the rear window 9. The three connection rods 55, 57, 59 are hingedly connected to one another at a pivot 60 and the second connection rod 57 is at 61 hingedly connected to the pedestal 45. The third connection rod 59 is connected at a connection point 62 to the rear roof section 7, and the first connection rod 55 is connected at a hinge 63 to the bottom section of the rear window 9.

The mode of operation of the retractable top 3 of the motor vehicle will now be described in particular with respect to FIGS. 2 to 5.

Figure 2:
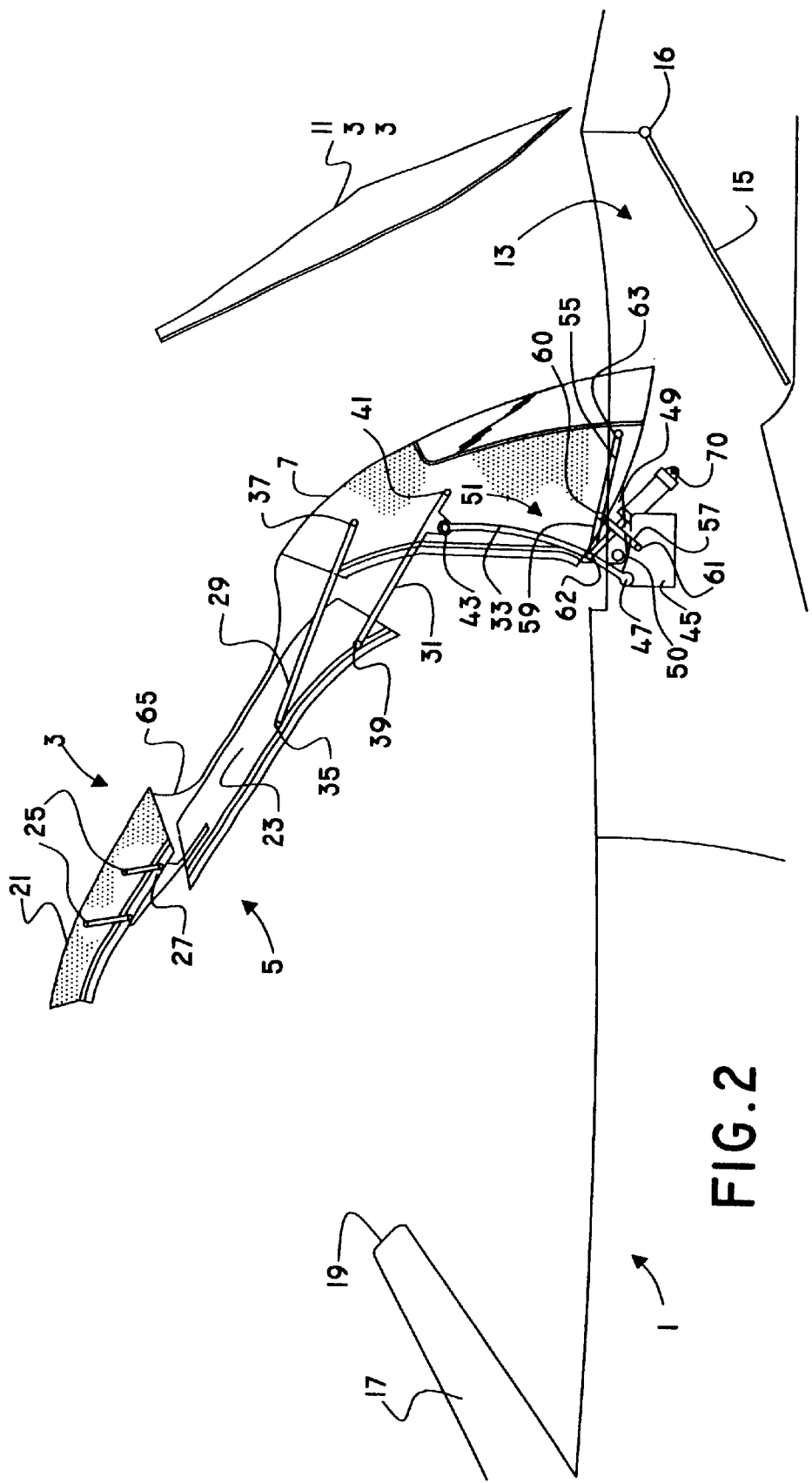
FIG. 2 shows a partially opened position of the top of the motor vehicle according to FIG. 1.

FIG. 2 shows an already clearly opened position of the motor vehicle top 3 according to the invention. When pivoting or lowering the top 3 of the motor vehicle into the top accommodation space 13, the cover 11 is pivoted upwardly and the bottom plate 15 is pivoted downwardly.

As can clearly be seen from FIGS. 2 to 5, the top 3 of the motor vehicle further comprises an outer skin 65 e.g. in the form of a textile tissue, which, as may be seen in FIG. 1, is connected in a front connection portion 67, that can be seen in FIG. 11 by a hatching, and in a rear connection portion 69, which can be recognized in a hatched portion of the rear roof section 7, to the first front partial roof section 21, and the rear roof section 7, respectively. Inbetween, in particular in the area of the second central partial roof section 23, the outer skin is released from the second central partial roof section 23.

Advantageously, the outer skin 65 is stressed by a corresponding tension across the roof sections so that a tensile force acts from the front to the first front roof section 21. When releasing the closure device of the top 3 from the upper edge 19 of the windshield, the first roof section 21 is pivoted upwards by means of a hinged connection rod 25 caused by the tension in outer skin 65. This can be supported from the beginning or subsequently in that a force exerted by a conventional top-operating motor 70 via the side linkages to the first front roof section 21 which causes same to be pivoted upwardly to a maximum pivot position.

As may further be seen from FIG. 2, the rear roof section 7 was pivoted around the point of rotation 50 towards the back and at the same time the second central partial roof section 23 was pivoted downwardly by means of connection rods 29, 31 and 33.

When further pivoting-in the top 3 of the motor vehicle, the first front partial roof section 21 is slidably moved along slide rail 27 and therefore reaches a position between the second central partial roof section 23 and the rear partial roof section 7. By means of the connection rods 29, 31, 33 the second central partial roof section 23 is pivoted together with the first front partial roof section 21 with respect to the rear partial roof section 7 and thereby reaches an end position according to FIGS. 4 and 5.

Figure 3:
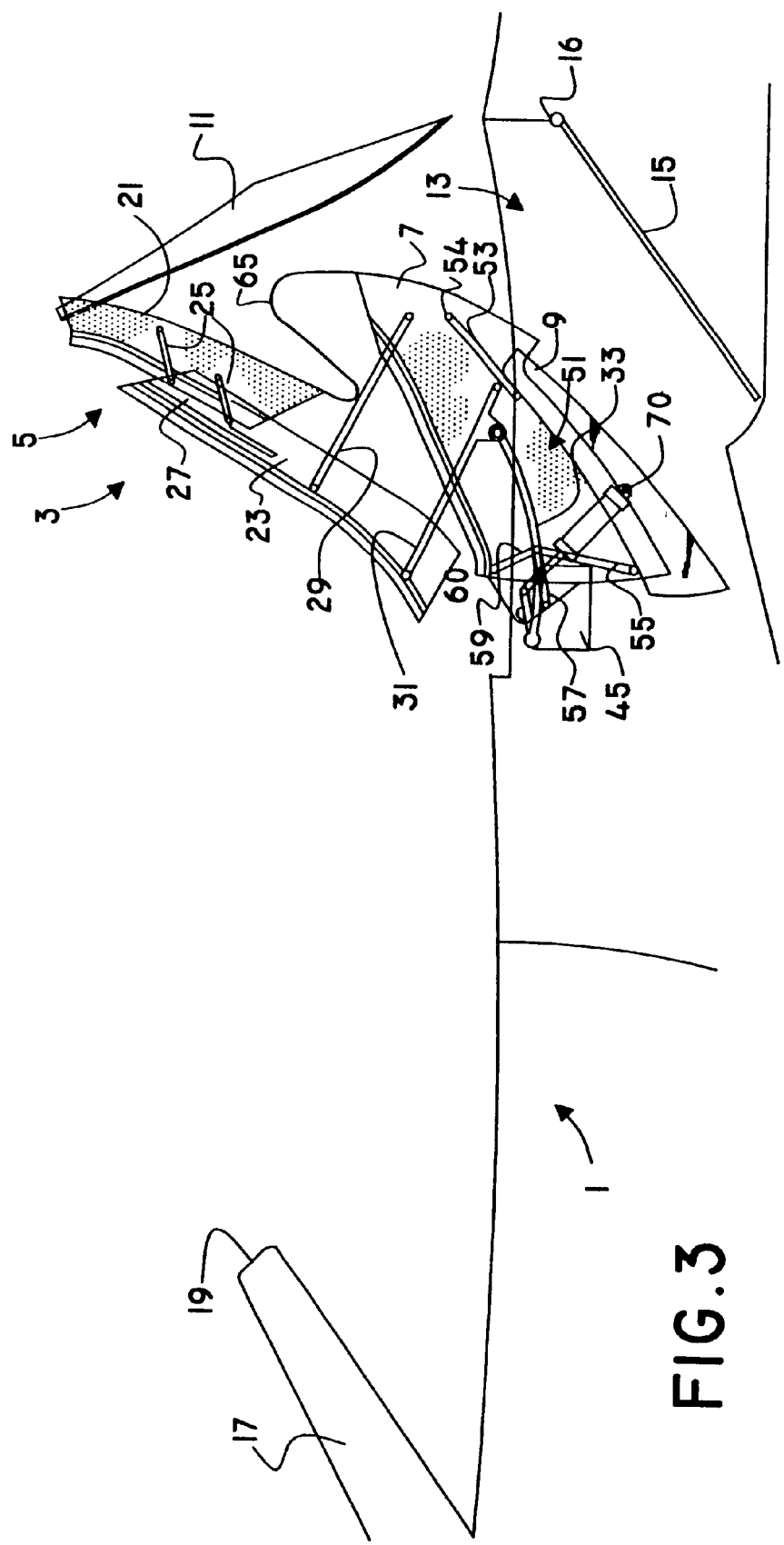
FIG. 3 shows an almost hidden position of the top of the motor vehicle according to FIG. 1.

As may further be seen from FIG. 3, the rear window 9 is moved by means of the hinged mechanism 51 and the rotary hinge rod 53 into the interior of the rear roof section 7, which results in a further saving of space of the top 3 of the motor vehicle in folded condition.

Figure 4:
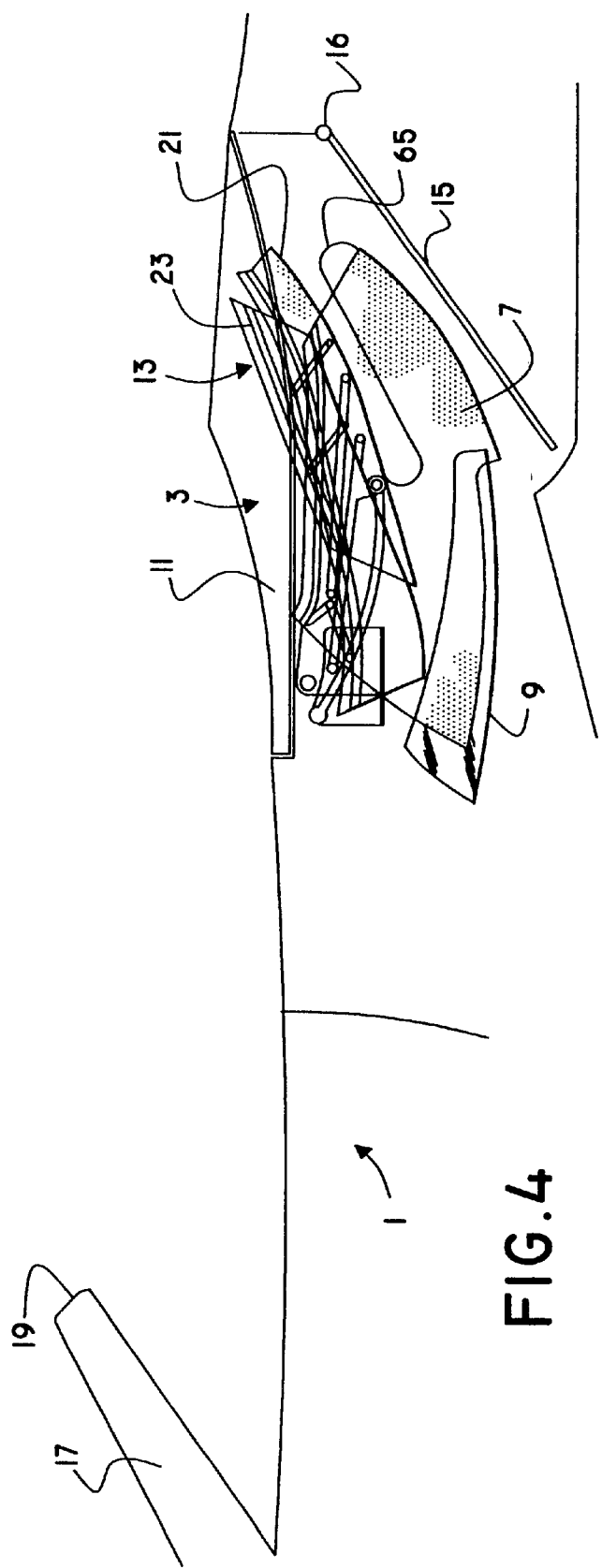
FIG. 4 shows a fully hidden position of the top of the motor vehicle according to FIG. 1.
Figure 5:
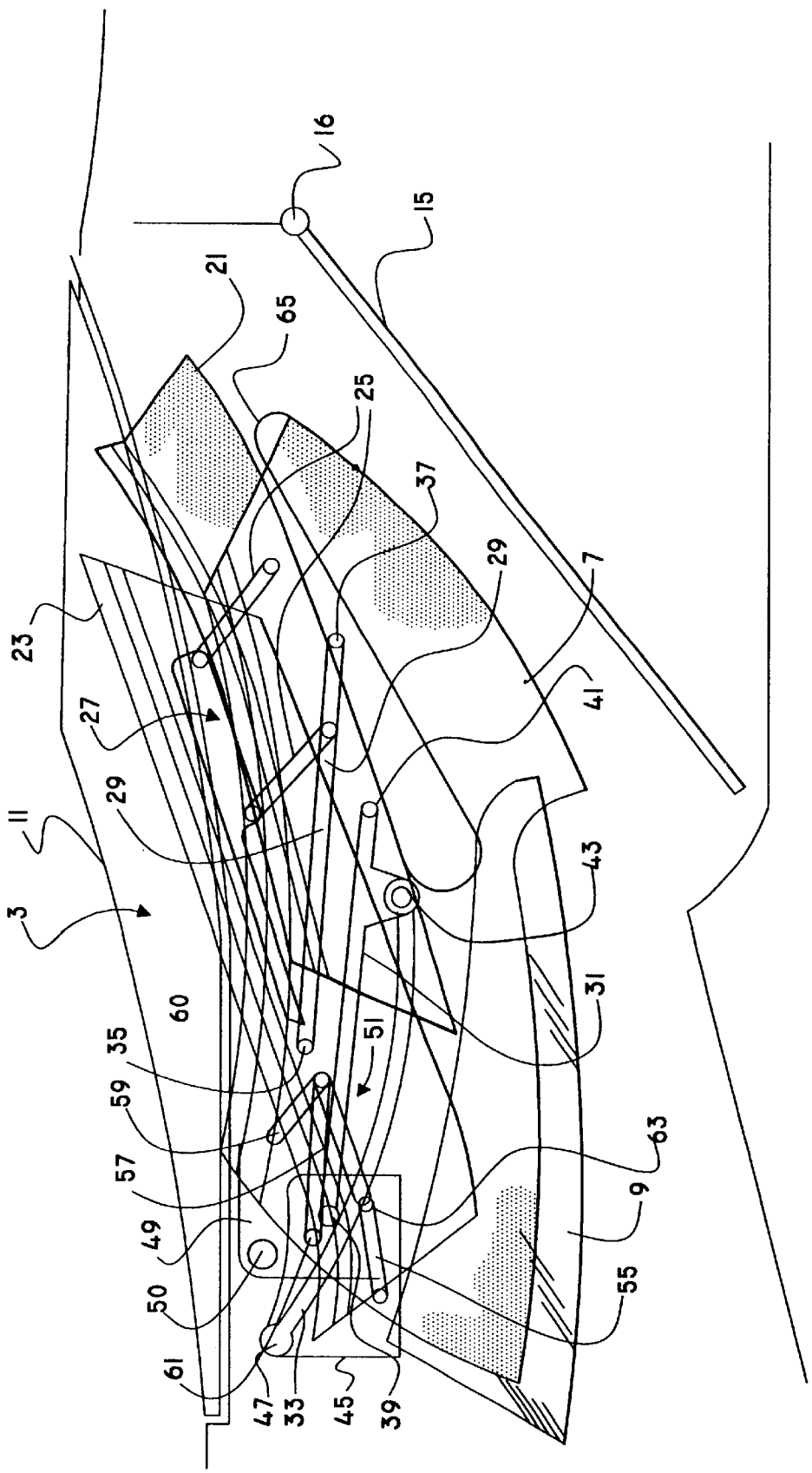
FIG. 5 shows in an enlarged scale the top of the motor vehicle in hidden position according to FIG. 4.

FIG. 5 shows the folded-in and lowered top 3 of the motor vehicle and shown in FIG. 4, in an enlarged scale as a section of FIG. 4. It becomes clear therefrom how advantageously and space-saving the motor vehicle top 4 according to the invention can be folded up.

What is claimed is:

1. A retractable top (3) of a motor vehicle (1) having a windshield (17) and a passenger compartment, said top (3) being movable between a hidden open position folded within an accommodation chamber (13) and a closed unfolded position extending from said chamber and covering the passenger compartment, an upper, substantially rigid roof section (5), which forms an upper roof section and which can be connected to an upper edge portion (19) of a windshield (17), a rear, substantially rigid roof section (7) connected by a first linkage (29, 31) to the upper roof section (5) and which extends behind the passenger compartment, and a rear window (9) which is arranged at the rear roof section (7), wherein the upper and the lower roof sections (5, 7) move relative to each other upon top (3) movement between folded and unfolded positions, characterized in that the upper roof section (5) comprises a first front roof section (21) and a second central (23) roof section, a second linkage (25, 27) interconnecting the first and second roof sections (21, 23) for relative movement upon movement of the top (3) from the unfolded position to the folded position, said first and second linkages moving the second roof section (23) within the rear roof section (7) and at the same time moving the first front roof section (21) over the second roof section (23) to a position lying between the second roof section (23) and the rear roof section (7) in the top unfolded position.

2. The retractable top as claimed in claim 1, further characterized in that it comprises a flexible outer skin (65) that is connected to the rear roof section (7) and to the first front roof section (21) so that said flexible outer skin covers the second central roof section (23) in unfolded roof position.

3. The retractable top as claimed in claim 2, further characterized in that the flexible outer skin (65) exerts a tensile force on the first roof section (21) in the top unfolded position.

4. The retractable top as claimed in one of claims 1, 2 or 3, characterized in that the second linkage includes a slide rail (27) slidably mounted on the second roof section and two hinge joint rods (25) pivotally interconnecting the slide rail (27) and the first roof section (21) to enable the first roof section (21) to pivot over the second roof section (23) and to move to said position lying between the second roof section (23) and the rear roof section (7) in the top folded position.

5. The retractable top as claimed in claim 4, characterized by including means for exerting a force onto the first front partial roof section for moving the top (3), which causes the partial roof section to move upwardly and subsequently over the second central roof position (23).

6. The retractable top as claimed in claim 5, characterized in that said force generating means is a motor.

7. The retractable top as claimed in claim 6, characterized in that the first linkage means comprises an upper connection rod (29) and a lower connection rod (31) that pivotally interconnect (35, 37 and 39, 41) the central roof section (23) and the rear roof section (7).

8. The retractable top as claimed in claim 7, characterized in that the vehicle includes a mounting pedestal (45), and by including a further connection rod (33) pivotally interconnecting the pedestal (45) and the upper connection rod (31).

9. The retractable top as claimed in claim 8, characterized in that the rear window (9) is connected to the rear roof section (7) by a third linkage which moves the rear window (9) into the rear roof section (7) as the top 3 is moved into folded position.

10. A retractable hard top (3) of a motor vehicle (1) having a windshield (17) and a passenger compartment, said top (3) being movable between a hidden open position folded within an accommodation chamber (13) and a closed unfolded position extending from said chamber and covering the passenger compartment, said top (3) comprising a plurality of interconnected front (21), middle (23) and rear (7) roof sections which move relative to each other upon top movement between a folded position and an unfolded position, in which said roof sections cover said passenger compartment, characterized by including a flexible outer skin (65) that is connected to the rear roof section (7) and to the first front roof section (21) so as to cover all of said roof sections in the unfolded position.

* * * * *